United States Patent
Ozeki et al.

(10) Patent No.: US 8,500,920 B2
(45) Date of Patent: *Aug. 6, 2013

(54) PERMANENT MAGNET AND MANUFACTURING METHOD THEREOF

(75) Inventors: Izumi Ozeki, Ibaraka (JP); Katsuya Kume, Ibaraki (JP); Keisuke Hirano, Ibaraki (JP); Tomohiro Omure, Ibaraki (JP); Keisuke Taihaku, Ibaraki (JP); Takashi Ozaki, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/499,435

(22) PCT Filed: Mar. 28, 2011

(86) PCT No.: PCT/JP2011/057566
§ 371 (c)(1),
(2), (4) Date: Mar. 30, 2012

(87) PCT Pub. No.: WO2011/125585
PCT Pub. Date: Oct. 13, 2011

(65) Prior Publication Data
US 2012/0194310 A1    Aug. 2, 2012

(30) Foreign Application Priority Data
Mar. 31, 2010    (JP) .................................. 2010-082888

(51) Int. Cl.
*H01F 1/057*    (2006.01)
(52) U.S. Cl.
USPC ................ 148/101; 148/302; 419/12; 75/244
(58) Field of Classification Search
USPC ..................... 148/101, 302; 419/12; 75/244
See application file for complete search history.

(56) References Cited

U.S. PATENT DOCUMENTS

| | | | | |
|---|---|---|---|---|
| 5,641,363 A | * | 6/1997 | Fukuno et al. | 148/104 |
| 2004/0134567 A1 | * | 7/2004 | Kanekiyo et al. | 148/302 |

(Continued)

FOREIGN PATENT DOCUMENTS

| | | |
|---|---|---|
| CN | 101031984 A | 9/2007 |
| EP | 2 273 516 A1 | 1/2011 |

(Continued)

OTHER PUBLICATIONS

Notification of Grounds for Rejection issued on Nov. 11, 2011 in JP 2011-069067.

(Continued)

*Primary Examiner* — Roy King
*Assistant Examiner* — Timothy Haug
(74) *Attorney, Agent, or Firm* — Sughrue Mion, PLLC

(57) ABSTRACT

There are provided a permanent magnet and a manufacturing method thereof capable of densely sintering the entirety of the magnet without making a gap between a main phase and a grain boundary phase in the sintered magnet. To fine powder of milled neodymium magnet is added an organometallic compound solution containing an organometallic compound expressed with a structural formula of $M\text{-}(OR)_X$ (M represents V, Mo, Zr, Ta, Ti, W or Nb, R represents a substituent group consisting of a straight-chain or branched-chain hydrocarbon, $_X$ represents an arbitrary integer) so as to uniformly adhere the organometallic compound to particle surfaces of the neodymium magnet powder. Thereafter, a compact body formed through powder compaction is held for several hours in hydrogen atmosphere at 200 through 900 degrees Celsius. Thereafter, through sintering process, a permanent magnet is manufactured.

4 Claims, 11 Drawing Sheets

U.S. PATENT DOCUMENTS

| | | | |
|---|---|---|---|
| 2004/0189426 A1* | 9/2004 | Hidaka et al. | 335/202 |
| 2005/0133117 A1 | 6/2005 | Tayu et al. | |
| 2009/0053094 A1* | 2/2009 | Morimoto et al. | 420/82 |
| 2011/0000586 A1* | 1/2011 | Nomura et al. | 148/514 |
| 2011/0267160 A1* | 11/2011 | Ozeki et al. | 335/302 |
| 2012/0182107 A1* | 7/2012 | Ozeki et al. | 335/302 |
| 2012/0182108 A1* | 7/2012 | Ozeki et al. | 335/302 |
| 2012/0182109 A1* | 7/2012 | Ozeki et al. | 335/302 |
| 2012/0187327 A1* | 7/2012 | Ozeki et al. | 252/62.51 R |
| 2012/0187328 A1* | 7/2012 | Ozeki et al. | 252/62.51 R |
| 2012/0194310 A1* | 8/2012 | Ozeki et al. | 335/302 |

FOREIGN PATENT DOCUMENTS

| | | | |
|---|---|---|---|
| JP | 7-263265 A | 10/1995 | |
| JP | 10-064746 A | 3/1998 | |
| JP | 3298219 B2 | 4/2002 | |
| JP | 2004-250781 A | 9/2004 | |
| JP | 2007-134417 A | 5/2007 | |
| JP | 2006-270087 A | 10/2008 | |
| JP | 2009-259956 A | 11/2009 | |
| JP | 2009259956 * | 11/2009 | 335/302 |
| WO | 2009/128459 A1 | 10/2009 | |

OTHER PUBLICATIONS

Notification of the First Office Action issued in Application No. 201180003993.2 dated Sep. 28, 2012, with an English language translation.

European Search Report issued in Application No. 11765485.5 dated Oct. 8, 2012.

* cited by examiner

FIG. 8

|  | M | OR | CALCINATION | CARBON CONTENT (wt%) |
|---|---|---|---|---|
| EMBODIMENT 1 | Nb | n-PROPOXIDE | YES | 0.06 |
| EMBODIMENT 2 | Nb | n-BUTOXIDE | YES | 0.10 |
| COMPARATIVE EXAMPLE 1 | Nb | n-PROPOXIDE | NO | 0.13 |
| COMPARATIVE EXAMPLE 2 | Nb | n-BUTOXIDE | NO | 0.17 |

ADDITIVE M-(OR)x

FIG. 9
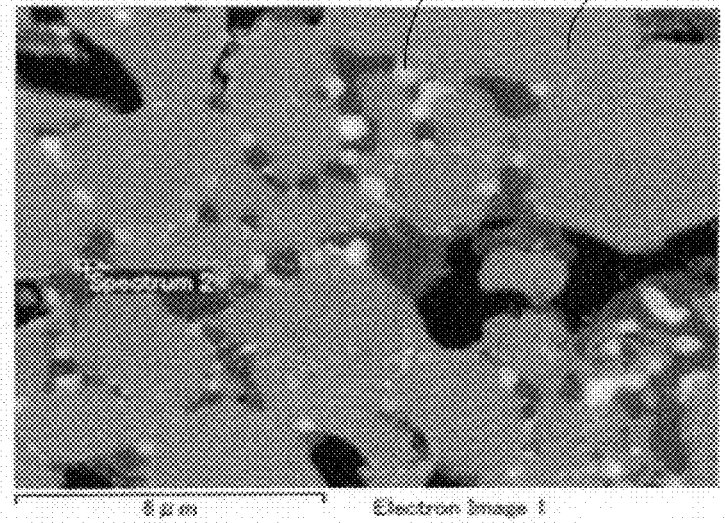
EMBODIMENT 1
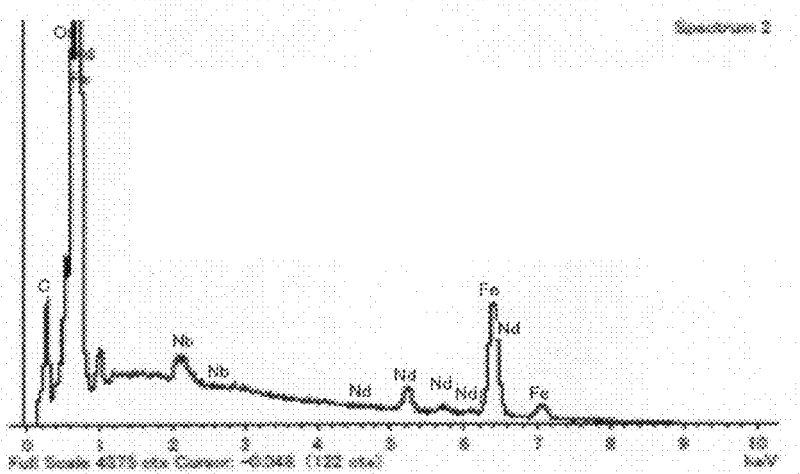

EMBODIMENT 1

PERMANENT MAGNET AND MANUFACTURING METHOD THEREOF

CROSS REFERENCE TO RELATED APPLICATIONS

This application is a National Stage of International Application No. PCT/JP2011/057566 filed Mar. 28, 2011, claiming priority based on Japanese Patent Application No. 2010-082888 filed Mar. 31, 2010, the contents of all of which are incorporated herein by reference in their entirety.

TECHNICAL FIELD

The present invention relates to a permanent magnet and manufacturing method thereof.

BACKGROUND ART

In recent years, a decrease in size and weight, an increase in power output and an increase in efficiency have been required in a permanent magnet motor used in a hybrid car, a hard disk drive, or the like. To realize such a decrease in size and weight, an increase in power output and an increase in efficiency in the permanent magnet motor mentioned above, film-thinning and a further improvement in magnetic performance are required of a permanent magnet to be buried in the permanent magnet motor. Meanwhile, as permanent magnet, there have been known ferrite magnets, Sm—Co-based magnets, Nd—Fe—B-based magnets, $Sm_2Fe_{17}N_x$-based magnets or the like. As permanent magnet for permanent magnet motor, there are typically used Nd—Fe—B-based magnets due to remarkably high residual magnetic flux density.

As method for manufacturing a permanent magnet, a powder sintering process is generally used. In this powder sintering process, raw material is coarsely milled first and furthermore, is finely milled into magnet powder by a jet mill (dry-milling) method. Thereafter, the magnet powder is put in a mold and pressed to form in a desired shape with magnetic field applied from outside. Then, the magnet powder formed and solidified in the desired shape is sintered at a predetermined temperature (for instance, at a temperature between 800 and 1150 degrees Celsius for the case of Nd—Fe—B-based magnet) for completion.

On the other hand, as to Nd-based magnets such as Nd—Fe—B magnets, poor heat resistance is pointed to as defect. Therefore, in case a Nd-based magnet is employed in a permanent magnet motor, continuous driving of the motor brings the magnet into gradual decline of coercive force and residual magnetic flux density. Then, in case of employing a Nd-based magnet in a permanent magnet motor, in order to improve heat resistance of the Nd-based magnet, Dy (dysprosium) or Tb (terbium) having high magnetic anisotropy is added to further improve coercive force.

Meanwhile, the coercive force of a magnet can be improved without using Dy or Tb. For example, it has been known that the magnetic performance of a permanent magnet can be basically improved by making the crystal grain size in a sintered body very fine, because the magnetic characteristics of a magnet can be approximated by a theory of single-domain particles. Here, in order to make the grain size in the sintered body very fine, a particle size of the magnet raw material before sintering also needs to be made very fine. However, even if the magnet raw material finely milled into a very fine particle size is compacted and sintered, grain growth occurs in the magnet particles at the time of sintering. Therefore, after sintering, the crystal grain size in the sintered body increases to be larger than the size before sintering, and as a result, it has been impossible to achieve a very fine crystal grain size. In addition, if the crystal grain has a larger size, the domain walls created in a grain easily move, resulting in drastic decrease of the coercive force.

Therefore, as a means for inhibiting the grain growth of magnet particles, there is considered a method of adding a substance for inhibiting the grain growth of the magnet particles (hereinafter referred to as a grain growth inhibitor), to the magnet raw material before sintering. According to this method, for example, the surface of a magnet particle before sintering is coated with the grain growth inhibitor such as a metal compound whose melting point is higher than the sintering temperature, which makes it possible to inhibit the grain growth of magnet particles at sintering. In JP Laid-open Patent Application Publication No. 2004-250781, for example, phosphorus is added as grain growth inhibitor to the magnet powder.

PRIOR ART DOCUMENT

Patent Document

Patent document 1: Japanese Registered Patent Publication No. 3298219 (pages 4 and 5)

Patent document 2: Japanese Laid-Open Patent Application Publication No. 2004-250781 (pages 10-12, FIG. 2)

DISCLOSURE OF THE INVENTION

Problem to be Solved by the Invention

However, as described in Patent Document 2, if the grain growth inhibitor is added to the magnet powder in a manner being previously contained in an ingot of the magnet raw material, the grain growth inhibitor is dispersed in the magnet particles, instead of being settled on the surfaces of the magnet particles. As a result, the grain growth during sintering cannot be sufficiently inhibited, and also the residual magnetic flux density is lowered. Furthermore, even in a case where each magnet particle after sintering can be successfully made very fine by the inhibition of grain growth, exchange interaction may be propagated among the magnet particles when the magnet particles tightly aggregate. As a result, magnetization reversal easily occurs in the magnet particles in a case a magnetic field is applied from outside, causing the decrease of coercive force, which has been problematic.

Further, it would be practicable to add the grain growth inhibitor in a state of being distributed into an organic solvent, to a Nd-based magnet so as to concentrate the grain growth inhibitor in grain boundaries of the magnet. Generally speaking, however, once an organic solvent is added to a magnet, carbon-containing substances remain in the magnet even if the organic solvent is later volatilized by vacuum drying or the like. Since Nd and carbons exhibit significantly high reactivity therebetween, carbon-containing substances form carbide when remaining up to high-temperature stage in a sintering process. Consequently, the carbide thus formed makes a gap between a main phase and a grain boundary phase of the sintered magnet and accordingly the entirety of the magnet cannot be sintered densely, which causes a problem of serious degrade in the magnetic performance. Even if the gap is not made, the secondarily-formed carbide makes alpha iron separated out in the main phase of the sintered magnet, which causes a problem of serious degrade in the magnetic properties.

The present invention has been made to resolve the above described conventional problem and the object thereof is to provide a permanent magnet and manufacturing method thereof capable of: efficiently concentrating V, Mo, Zr, Ta, Ti, W, or Nb contained in an organometallic compound on grain boundaries of the magnet; previously reducing carbon content contained in magnet particles by calcining in hydrogen atmosphere the organometallic-compound-added magnet powder before sintering; and densely sintering the entirety of the magnet without making a gap between a main phase and a grain boundary phase in the sintered magnet.

Means for Solving the Problem

To achieve the above object, the present invention provides a permanent magnet manufactured through steps of: milling magnet material into magnet powder; adding an organometallic compound expressed with a structural formula of $M\text{-}(OR)_X$ (M representing V, Mo, Zr, Ta, Ti, W or Nb, R representing a substituent group consisting of a straight-chain or branched-chain hydrocarbon, and $_X$ representing an arbitrary integer) to the magnet powder obtained at the step of milling magnet material and getting the organometallic compound adhered to particle surfaces of the magnet powder; compacting the magnet powder of which particle surfaces have got adhesion of the organometallic compound so as to obtain a compact body; calcining the compact body in hydrogen atmosphere so as to obtain a calcined body; and sintering the calcined body.

In the above-described permanent magnet of the present invention, metal contained in the organometallic compound is concentrated in grain boundaries of the permanent magnet after sintering.

In the above-described permanent magnet of the present invention, R in the structural formula is an alkyl group.

In the above-described permanent magnet of the present invention, R in the structural formula is an alkyl group of which carbon number is any one of integer numbers 2 through 6.

In the above-described permanent magnet of the present invention, residual carbon content after sintering is 0.1 wt % or less.

In the above-described permanent magnet of the present invention, in the step of calcining the compact body, the compact body is held for predetermined length of time within a temperature range between 200 and 900 degrees Celsius.

To achieve the above object, the present invention further provides a manufacturing method of a permanent magnet comprising steps of: milling magnet material into magnet powder; adding an organometallic compound expressed with a structural formula of $M\text{-}(OR)_X$ (M representing V, Mo, Zr, Ta, Ti, W or Nb, R representing a substituent group consisting of a straight-chain or branched-chain hydrocarbon, and $_X$ representing an arbitrary integer) to the magnet powder obtained at the step of milling magnet material and getting the organometallic compound adhered to particle surfaces of the magnet powder; compacting the magnet powder of which particle surfaces have got adhesion of the organometallic compound so as to obtain a compact body; calcining the compact body in hydrogen atmosphere so as to obtain a calcined body; and sintering the calcined body.

In the above-described manufacturing method of permanent magnet of the present invention, R in the structural formula is an alkyl group.

In the above-described manufacturing method of permanent magnet of the present invention, R in the structural formula is an alkyl group of which carbon number is any one of integer numbers 2 through 6.

In the above-described manufacturing method of permanent magnet of the present invention, in the step of calcining the compact body, the compact body is held for predetermined length of time within a temperature range between 200 and 900 degrees Celsius.

Effect of the Invention

According to the permanent magnet of the present invention, V, Mo, Zr, Ta, Ti, W, or Nb contained in the organometallic compound can be efficiently concentrated in grain boundaries of the magnet. As a result, the grain growth during sintering can be inhibited, and at the same time, magnetization reversal of each magnet particle is prevented through disrupting exchange interaction among the magnet particles, enabling magnetic properties to be improved. Furthermore, as the additive amount of V, Mo, Zr, Ta, Ti, W, or Nb can be made smaller than that in a conventional method, the residual magnetic flux density can be inhibited from lowering. Further, by calcining the organometallic-compound-added magnet in hydrogen atmosphere before sintering, carbon content contained in magnet particles can be reduced previously. Consequently, the entirety of the magnet can be sintered densely without making a gap between a main phase and a grain boundary phase in the sintered magnet, and decline of coercive force can be avoided. Further, considerable alpha iron does not separate out in the main phase of the sintered magnet and serious deterioration of magnetic properties can be avoided.

According to the permanent magnet of the present invention, V, Mo, Zr, Ta, Ti, W, or Nb, each of which is a refractory metal, is concentrated in grain boundaries of the magnet after sintering. Therefore, V, Mo, Zr, Ta, Ti, W, or Nb concentrated at the grain boundaries prevents grain growth in the magnet particles at sintering, and at the same time disrupts exchange interaction among the magnet particles after sintering so as to prevent magnetization reversal in the magnet particles, making it possible to improve the magnetic performance thereof.

According to the permanent magnet of the present invention, the organometallic compound consisting of an alkyl group is used as organometallic compound to be added to magnet powder. Therefore, thermal decomposition of the organometallic compound can be caused easily when the compact body of the magnet powder is calcined in hydrogen atmosphere. Consequently, carbon content in the compact body can be reduced more reliably.

According to the permanent magnet of the present invention, the organometallic compound consisting of an alkyl group of which carbon number is any one of integer numbers 2 through 6 is used as organometallic compound to be added to magnet powder. Therefore, the organometallic compound can be thermally decomposed at low temperature when the compact body is calcined in hydrogen atmosphere. Consequently, thermal decomposition of the organometallic compound can be caused more easily in the entirety of the compact body. In other words, carbon content in the calcined body can be reduced more reliably through a calcination process.

According to the permanent magnet of the present invention, the residual carbon content after sintering is 0.1 wt % or less. This configuration avoids occurrence of a gap between a main phase and a grain boundary phase, places the entirety of the magnet in densely-sintered state and makes it possible to avoid decline in residual magnetic flux density. Further, this configuration prevents considerable alpha iron from separating out in the main phase of the sintered magnet so that serious deterioration of magnetic properties can be avoided.

According to the permanent magnet of the present invention, in the step of calcining the compact body, the compact body is held for predetermined length of time within a temperature range between 200 and 900 degrees Celsius. Therefore, thermal decomposition of the organometallic compound can be caused reliably and carbon contained therein can be burned off more than required.

According to the manufacturing method of a permanent magnet of the present invention, it is made possible to manufacture a permanent magnet configured such that V, Mo, Zr, Ta, Ti, W, or Nb contained in the organometallic compound can be efficiently concentrated in grain boundaries of the magnet. As a result, in the manufactured permanent magnet, grain growth in the magnet particles at sintering can be inhibited and at the same time exchange interaction among the magnet particles can be disrupted so as to prevent magnetization reversal in the magnet particles, making it possible to improve the magnetic performance thereof. Furthermore, the additive amount of V, Mo, Zr, Ta, Ti, W, or Nb can be made smaller than the conventional amount, so that decline in residual magnetic flux density can be inhibited. Further, by calcining the organometallic-compound-added magnet in hydrogen atmosphere before sintering, carbon content contained in magnet particles can be reduced previously. Consequently, the entirety of the magnet can be sintered densely without making a gap between a main phase and a grain boundary phase in the sintered magnet and, decline of coercive force can be avoided. Further, considerable alpha iron does not separate out in the main phase of the sintered magnet and serious deterioration of magnetic properties can be avoided.

According to the manufacturing method of a permanent magnet of the present invention, the organometallic compound consisting of an alkyl group is used as organometallic compound to be added to magnet powder. Therefore, thermal decomposition of the organometallic compound can be caused easily when the compact body is calcined in hydrogen atmosphere. Consequently, carbon content in the compact body can be reduced more reliably.

According to the manufacturing method of a permanent magnet of the present invention, the organometallic compound consisting of an alkyl group of which carbon number is any one of integer numbers 2 through 6 is used as organometallic compound to be added to magnet powder. Therefore, the organometallic compound can be thermally decomposed at low temperature when the compact body is calcined in hydrogen atmosphere. Consequently, thermal decomposition of the organometallic compound can be caused more easily in the entirety of the compact body. In other words, carbon content in the calcined body can be reduced more reliably through a calcination process.

According to the manufacturing method of a permanent magnet of the present invention, in the step of calcining the compact body, the compact body is held for predetermined length of time within a temperature range between 200 and 900 degrees Celsius. Therefore, thermal decomposition of the organometallic compound can be caused reliably and carbon contained therein can be burned off more than required.

BRIEF DESCRIPTION OF THE DRAWINGS

FIG. 8 is a table illustrating residual carbon content in permanent magnets of embodiments 1 and 2 and comparative examples 1 and 2.

FIG. 9 is an SEM image and an element analysis result on a grain boundary phase of the permanent magnet of the embodiment 1 after sintering.

BEST MODE FOR CARRYING OUT THE INVENTION

Specific embodiments of a permanent magnet and a method for manufacturing the permanent magnet according to the present invention will be described below in detail with reference to the drawings.

[Constitution of Permanent Magnet]

Figure 1:
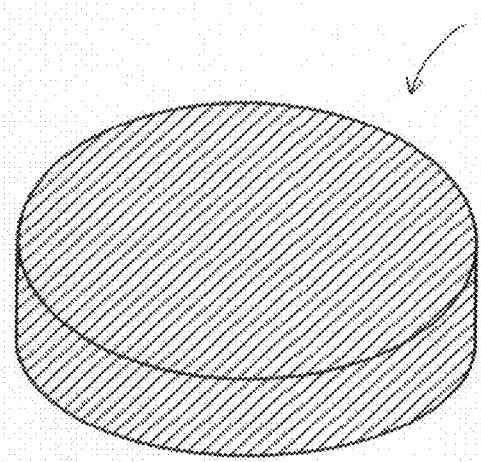
FIG. 1 is an overall view of a permanent magnet directed to the invention.

First, a constitution of a permanent magnet 1 will be described. FIG. 1 is an overall view of the permanent magnet directed to the present invention. Incidentally, the permanent magnet 1 depicted in FIG. 1 is formed into a cylindrical shape. However, the shape of the permanent magnet 1 may be changed in accordance with the shape of a cavity used for compaction.

As the permanent magnet 1 according to the present invention, an Nd—Fe—B-based magnet may be used, for example. Further, Nb (niobium), V (vanadium), Mo (molybdenum), Zr (zirconium), Ta (tantalum), Ti (titanium) or W (tungsten) for increasing the coercive force of the permanent magnet 1 is concentrated on the boundary faces (grain boundaries) of Nd crystal grains forming the permanent magnet 1. Incidentally, the contents of respective components are regarded as Nd: 25 to 37 wt %, any one of Nb, V, Mo, Zr, Ta, Ti and W (hereinafter referred to as "Nb (or other)"): 0.01 to 5 wt %, B: 1 to 2 wt %, and Fe (electrolytic iron): 60 to 75 wt %. Furthermore, the permanent magnet 1 may include other elements such as Co, Cu, Al or Si in small amount, in order to improve the magnetic properties thereof.

Figure 2:
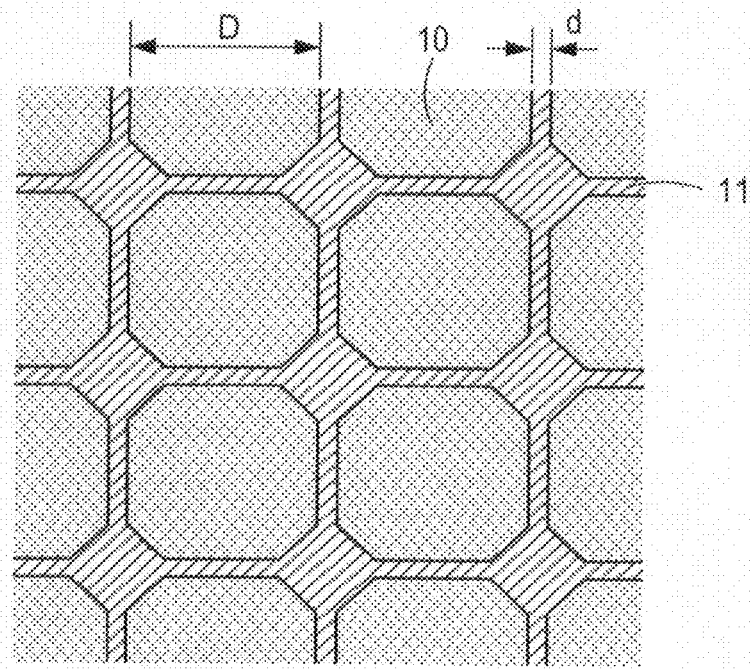
FIG. 2 is an enlarged schematic view in vicinity of grain boundaries of the permanent magnet directed to the invention.

Specifically, in the permanent magnet 1 according to the present invention, Nb (or other) is concentrated onto the grain boundaries of the Nd crystal grains 10 by generating a layer 11 (hereinafter referred to as refractory metal layer 11) in which Nb (or other) being a refractory metal substitutes for part of Nd on each surface (outer shell) of the Nd crystal grains 10 constituting the permanent magnet 1 as depicted in FIG. 2. FIG. 2 is an enlarged view showing the Nd crystal grains 10 constituting the permanent magnet 1. The refractory metal layer 11 is preferably nonmagnetic.

Here, in the present invention, the substitution of Nb (or other) is carried out before compaction of magnet powder through addition of an organometallic compound containing Nb (or other) milled as later described. Specifically, here, the organometallic compound containing the Nb (or other) is uniformly adhered to the surfaces of the Nd crystal grains 10 by wet dispersion and the Nb (or other) included in the organometallic compound diffusively intrudes into the crystal growth region of the Nd crystal grains 10 and substitutes for Nd, to form the refractory metal layers 11 shown in FIG. 2, when the magnet powder to which the organometallic compound containing Nb (or other) is added is sintered. Incidentally, the Nd crystal grain 10 may be composed of, for example, $Nd_2Fe_{14}B$ intermetallic compound, and the refractory metal layer 11 may be composed of, for example, NbFeB intermetallic compound.

Furthermore, in the present invention, specifically as later described, the organometallic compound containing Nb (or other) is expressed by $M\text{-}(OR)_X$ (in the formula, M represents V, Mo, Zr, Ta, Ti, W or Nb, R represents a substituent group consisting of a straight-chain or branched-chain hydrocarbon and $_X$ represents an arbitrary integer), and the organometallic compound containing Nb (or other) (such as niobium n-propoxide, niobium n-butoxide) is added to an organic solvent and mixed with the magnet powder in a wet condition. Thus, the organometallic compound containing Nb (or other) is dispersed in the organic solvent, enabling the organometallic compound containing Nb (or other) to be adhered onto the surfaces of Nd crystal grains 10 effectively.

Here, metal alkoxide is one of the organometallic compounds that satisfy the above structural formula $M\text{-}(OR)_X$ (in the formula, M represents V, Mo, Zr, Ta, Ti, W or Nb, R represents a substituent group consisting of a straight-chain or branched-chain hydrocarbon and $_X$ represents an arbitrary integer). The metal alkoxide is expressed by a general formula $M\text{-}(OR)$, (M: metal element, R: organic group, n: valence of metal or metalloid). Furthermore, examples of metal or metalloid composing the metal alkoxide include W, Mo, V, Nb, Ta, Ti, Zr, Ir, Fe, Co, Ni, Cu, Zn, Cd, Al, Ga, In, Ge, Sb, Y, lanthanide and the like. However, in the present invention, refractory metal is specifically used. Furthermore, for the purpose of preventing interdiffusion with the main phase of the magnet at sintering to be later described, V, Mo, Zr, Ta, Ti, W or Nb is preferably used from among refractory metals.

Furthermore, the types of the alkoxide are not specifically limited, and there may be used, for instance, methoxide, ethoxide, propoxide, isopropoxide, butoxide or alkoxide carbon number of which is 4 or larger. However, in the present invention, those of low-molecule weight are used in order to inhibit the carbon residue by means of thermal decomposition at a low temperature to be later described. Furthermore, methoxide carbon number of which is 1 is prone to decompose and difficult to deal with, therefore it is preferable to use alkoxide carbon number of which is 2 through 6 included in R, such as ethoxide, methoxide, isopropoxide, propoxide or butoxide. That is, in the present invention, it is preferable to use, as the organometallic compound to be added to the magnet powder, an organometallic compound expressed by $M\text{-}(OR)_x$ (in the formula, M represents V, Mo, Zr, Ta, Ti, W or Nb, R represents a straight-chain or branched-chain alkyl group and $_x$ represents an arbitrary integer) or it is more preferable to use an organometallic compound expressed by $M\text{-}(OR)_x$ (in the formula, M represents V, Mo, Zr, Ta, Ti, W or Nb, R represents a straight-chain or branched-chain alkyl group of which carbon number is 2 through 6, and $_x$ represents an arbitrary integer).

Furthermore, a compact body compacted through powder compaction can be sintered under appropriate sintering conditions so that Nb (or other) can be prevented from being diffused or penetrated (solid-solutionized) into the Nd crystal grains 10. Thus, in the present invention, even if Nb (or other) is added, Nb (or other) can be concentrated only within the grain boundaries after sintering. As a result, the phase of the $Nd_2Fe_{14}B$ intermetallic compound of the core accounts for the large proportion in volume, with respect to crystal grains as a whole (in other words, the sintered magnet in its entirety). Accordingly, the decrease of the residual magnetic flux density (magnetic flux density at the time when the intensity of the external magnetic field is brought to zero) can be inhibited.

Further, generally, in a case where sintered Nd crystal grains 10 are densely aggregated, exchange interaction is presumably propagated among the Nd crystal grains 10. As a result, when a magnetic field is applied from outside, magnetization reversal easily takes place in the crystal grains, and coercive force thereof decreases even if sintered crystal grains can be made to have a single domain structure. However, in the present invention, there are provided refractory metal layers 11 which are nonmagnetic and coat the surfaces of the Nd crystal grains 10, and the refractory metal layers 11 disrupt the exchange interaction among the Nd crystal grains 10. Accordingly, magnetization reversal can be prevented in the crystal grains, even if a magnetic field is applied from outside.

Figure 3:
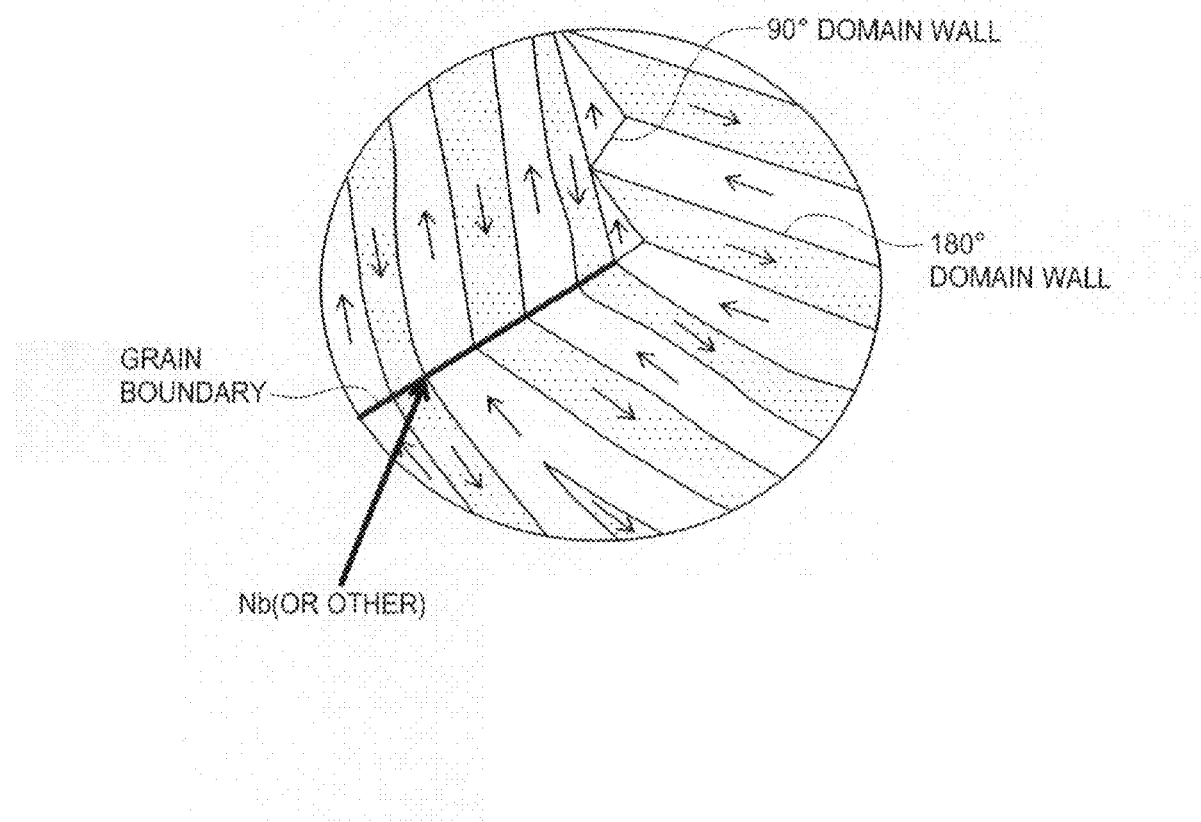
FIG. 3 is a pattern diagram illustrating a magnetic domain structure of the ferromagnetic body.

Furthermore, the refractory metal layers 11 coating the surfaces of the Nd crystal grains 10 operate as means of inhibiting what-is-called grain growth in which an average particle diameter increases in Nd crystal grains 10 at the sintering of the permanent magnet 1. Hereinafter, the mechanism of the inhibition of the grain growth in the permanent magnet 1 by the refractory metal layers 11 will be discussed referring to FIG. 3. FIG. 3 is a schematic view illustrating a magnetic domain structure of a ferromagnetic body.

Generally, there is excessive energy in a grain boundary which is an inconsistent interfacial boundary left between a crystal and another crystal. As a result, at high temperature, grain boundary migration occurs in order to lower the energy. Accordingly, when the magnet raw material is sintered at high temperature (for instance, 800 through 1150 degrees Celsius for Nd—Fe—B-based magnets), small magnet particles shrink and disappear, and remaining magnet particles grow in average diameter, in other words, what-is-called grain growth occurs.

Here, in the present invention, through adding the organometallic compound expressed by formula $M\text{-}(OR)_X$ (in the formula, M represents V, Mo, Zr, Ta, Ti, W or Nb, R represents a substituent group consisting of a straight-chain or branched-chain hydrocarbon and $_X$ represents an arbitrary integer), Nb (or other), the refractory metal, is concentrated on the surfaces of the interfacial boundary of magnet particles as illustrated in FIG. 3. Then, due to the concentrated refractory metal, the grain boundary migration which easily occurs at high temperature can be prevented, and grain growth can be inhibited.

Furthermore, it is desirable that the particle diameter D of the Nd crystal grain 10 is from 0.2 μm to 1.2 μm, preferably approximately 0.3 μm. Also, approximately 2 nm in thickness d of the refractory metal 11 is enough to prevent the grain growth of the Nd magnet particles upon sintering, and to disrupt exchange interaction among the Nd crystal grains 10. However, if the thickness d of the refractory metal 11 excessively increases, the rate of nonmagnetic components which exert no magnetic properties becomes large, so that the residual magnet flux density becomes low.

Figure 4:
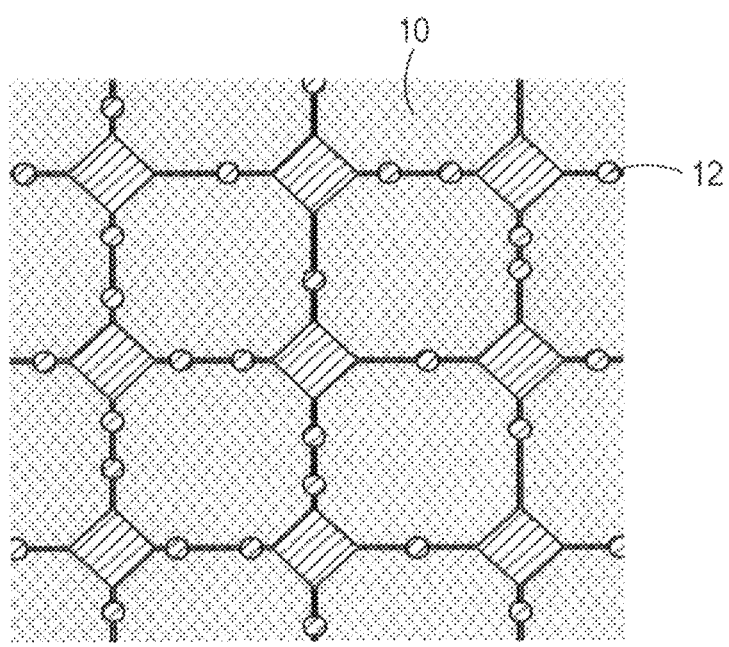
FIG. 4 is an enlarged schematic view in vicinity of grain boundaries of the permanent magnet directed to the invention.

However, as a configuration for concentrating refractory metal on the grain boundaries of the Nd crystal grains 10, there may be employed, as illustrated in FIG. 4, a configuration in which agglomerates 12 composed of refractory metal are scattered onto the grain boundaries of the Nd crystal grains 10. The similar effect (such as inhibiting grain growth and disrupting exchange interaction) can be obtained even in such a configuration as illustrated in FIG. 4. The concentration of refractory metal in the grain boundaries of the Nd crystal grains 10 can be confirmed, for instance, through scanning electron microscopy (SEM), transmission electron microscopy (TEM) or three-dimensional atom probe technique.

Incidentally, the refractory metal layer 11 is not required to be a layer composed of only one of Nb compound, V compound, Mo compound, Zr compound, Ta compound, Ti compound and W compound (hereinafter referred to as "Nb compound (or other)"), and may be a layer composed of a mixture of a Nb compound (or other) and a Nd compound. In such a case, a layer composed of the mixture of the Nb compound (or other) and the Nd compound are formed by adding the Nd compound. As a result, the liquid-phase sintering of the Nd magnet powder can be promoted at the time of sintering. The desirable Nd compound to be added may be $NdH_2$, neodymium acetate hydrate, neodymium(III) acetylacetonate trihydrate, neodymium(III) 2-ethylhexanoate, neodymium(III) hexafluoroacetylacetonate dihydrate, neodymium isopropoxide, neodymium(III) phosphate n-hydrate, neodymium trifluoroacetylacetonate, and neodymium trifluoromethanesulfonate or the like.

[First Method for Manufacturing Permanent Magnet]

Figure 5:
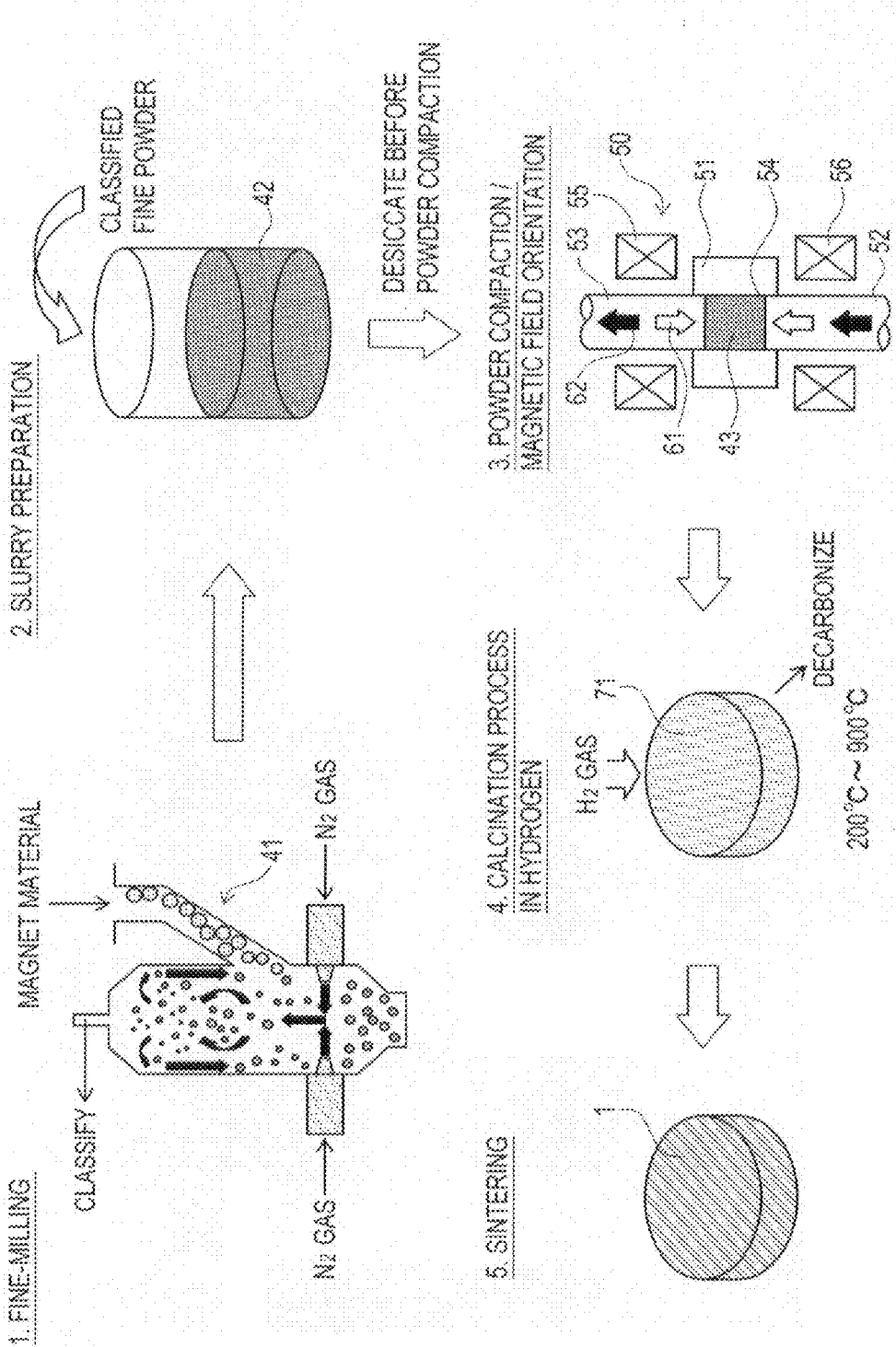
FIG. 5 is an explanatory diagram illustrating manufacturing processes of a permanent magnet according to a first manufacturing method of the invention.

Next, the first method for manufacturing the permanent magnet 1 directed to the present invention will be described below with reference to FIG. 5. FIG. 5 is an explanatory view illustrating a manufacturing process in the first method for manufacturing the permanent magnet 1 directed to the present invention.

First, there is manufactured an ingot comprising Nd—Fe—B of certain fractions (for instance, Nd: 32.7 wt %, Fe (electrolytic iron): 65.96 wt %, and B: 1.34 wt %). Thereafter the ingot is coarsely milled using a stamp mill, a crusher, etc. to a size of approximately 200 μm. Otherwise, the ingot is dissolved, formed into flakes using a strip-casting method, and then coarsely powdered using a hydrogen pulverization method.

Next, the coarsely milled magnet powder is finely milled with a jet mill 41 to form fine powder of which the average particle diameter is smaller than a predetermined size (for instance, 0.1 μm through 5.0 μm) in: (a) an atmosphere composed of inert gas such as nitrogen gas, argon (Ar) gas, helium (He) gas or the like having an oxygen content of substantially 0%; or (b) an atmosphere composed of inert gas such as nitrogen gas, Ar gas, He gas or the like having an oxygen content of 0.0001 through 0.5%. Here, the term "having an oxygen content of substantially 0%" is not limited to a case where the oxygen content is completely 0%, but may include a case where oxygen is contained in such an amount as to allow a slight formation of an oxide film on the surface of the fine powder.

In the meantime, organometallic compound solution is prepared for adding to the fine powder finely milled by the jet mill 41. Here, an organometallic compound containing Nb (or other) is added in advance to the organometallic compound solution and dissolved therein. Incidentally, in the present invention, it is preferable to use, as the organometallic compound to be dissolved, an organometallic compound (such as niobium n-propoxide or niobium n-butoxide) pertinent to formula $M\text{-}(OR)_x$ (in the formula, M represents V, Mo, Zr, Ta, Ti, W or Nb, R represents a straight-chain or branched-chain alkyl group of which carbon number is 2 through 6 and $x$ represents an arbitrary integer). Furthermore, the amount of the organometallic compound containing Nb (or other) to be dissolved is not particularly limited, however, it is preferably adjusted to such an amount that the Nb (or other) content with respect to the sintered magnet is 0.001 wt % through 10 wt %, or more preferably, 0.01 wt % through 5 wt %, as above described.

Successively, the above organometallic compound solution is added to the fine powder classified with the jet mill 41. Through this, slurry 42 in which the fine powder of magnet raw material and the organometallic compound solution are mixed is prepared. Here, the addition of the organometallic compound solution is performed in an atmosphere composed of inert gas such as nitrogen gas, Ar gas or He gas.

Thereafter, the prepared slurry 42 is desiccated in advance through vacuum desiccation or the like before compaction and desiccated magnet powder 43 is obtained. Then, the desiccated magnet powder is subjected to powder-compaction to form a given shape using a compaction device 50. There are dry and wet methods for the powder compaction, and the dry method includes filling a cavity with the desiccated fine powder and the wet method includes preparing slurry of the desiccated fine powder using solvent and then filling a cavity therewith. In this embodiment, a case where the dry method is used is described as an example. Furthermore, the organometallic compound solution can be volatilized at the sintering stage after compaction.

As illustrated in FIG. 5, the compaction device 50 has a cylindrical mold 51, a lower punch 52 and an upper punch 53, and a space surrounded therewith forms a cavity 54. The lower punch 52 slides upward/downward with respect to the mold 51, and the upper punch 53 slides upward/downward with respect to the mold 51, in a similar manner.

In the compaction device 50, a pair of magnetic field generating coils 55 and 56 is disposed in the upper and lower positions of the cavity 54 so as to apply magnetic flux to the magnet powder 43 filling the cavity 54. The magnetic field to be applied may be, for instance, 1 MA/m.

When performing the powder compaction, firstly, the cavity 54 is filled with the desiccated magnet powder 43. Thereafter, the lower punch 52 and the upper punch 53 are activated to apply pressure against the magnet powder 43 filling the cavity 54 in a pressurizing direction of arrow 61, thereby performing compaction thereof. Furthermore, simultaneously with the pressurization, pulsed magnetic field is applied to the magnet powder 43 filling the cavity 54, using the magnetic field generating coils 55 and 56, in a direction of arrow 62 which is parallel with the pressuring direction. As a result, the magnetic field is oriented in a desired direction. Incidentally, it is necessary to determine the direction in which the magnetic field is oriented while taking into consideration the magnetic field orientation required for the permanent magnet 1 formed from the magnet powder 43.

Furthermore, in a case where the wet method is used, slurry may be injected while applying the magnetic field to the cavity 54, and in the course of the injection or after termination of the injection, a magnetic field stronger than the initial magnetic field may be applied to perform the wet molding. Furthermore, the magnetic field generating coils 55 and 56 may be disposed so that the application direction of the magnetic field is perpendicular to the pressuring direction.

Secondly, the compact body 71 formed through the powder compaction is held for several hours (for instance, five hours) in hydrogen atmosphere at 200 through 900 degrees Celsius, or more preferably 400 through 900 degrees Celsius (for instance, 600 degrees Celsius), to perform a calcination process in hydrogen. The hydrogen feed rate during the calcination is 5 L/min. So-called decarbonization is performed during this calcination process in hydrogen. In the decarbonization, the organometallic compound is thermally decomposed so that carbon content in the calcined body can be decreased. Furthermore, calcination process in hydrogen is to be performed under a condition of 0.1 wt % carbon content or less in the calcined body, or more preferably 0.05 wt % or less. Accordingly, it becomes possible to densely sinter the permanent magnet 1 as a whole in the following sintering process, and the decrease in the residual magnetic flux density and coercive force can be prevented.

Here, $NdH_3$ exists in the compact body 71 calcined through the calcination process in hydrogen as above described, which indicates a problematic tendency to combine with oxygen. However, in the first manufacturing method, the compact body 71 after the calcination is brought to the later-described sintering without being exposed to the external air, eliminating the need for the dehydrogenation process. The hydrogen contained in the compact body is removed while being sintered.

Following the above, there is performed a sintering process for sintering the compact body 71 calcined through the calcination process in hydrogen. However, for a sintering method for the compact body 71, there can be employed, besides commonly-used vacuum sintering, pressure sintering in which the compact body 71 is sintered in a pressured state. For instance, when the sintering is performed in the vacuum sintering, the temperature is risen to approximately 800 through 1080 degrees Celsius in a given rate of temperature increase and held for approximately two hours. During this period, the vacuum sintering is performed, and the degree of vacuum is preferably equal to or smaller than $10^{-4}$ Torr. The compact body 71 is then cooled down, and again undergoes a heat treatment in 600 through 1000 degrees Celsius for two hours. As a result of the sintering, the permanent magnet 1 is manufactured.

Meanwhile, the pressure sintering includes, for instance, hot pressing, hot isostatic pressing (HIP), high pressure synthesis, gas pressure sintering, and spark plasma sintering (SPS) and the like. However, it is preferable to adopt the spark plasma sintering which is uniaxial pressure sintering in which pressure is uniaxially applied and also in which sintering is performed by electric current sintering, so as to prevent grain growth of the magnet particles during the sintering and also to prevent warpage formed in the sintered magnets. Incidentally, the following are the preferable conditions when the sintering is performed in the SPS; pressure is applied at 30 MPa, the temperature is risen in a rate of 10 degrees Celsius per minute until reaching 940 degrees Celsius in vacuum atmosphere of several Pa or less and then the state of 940 degrees Celsius in vacuum atmosphere is held for approximately five minutes. The compact body 71 is then cooled down, and again undergoes a heat treatment in 600 through 1000 degrees Celsius for two hours. As a result of the sintering, the permanent magnet 1 is manufactured.

[Second Method for Manufacturing Permanent Magnet]

Figure 6:
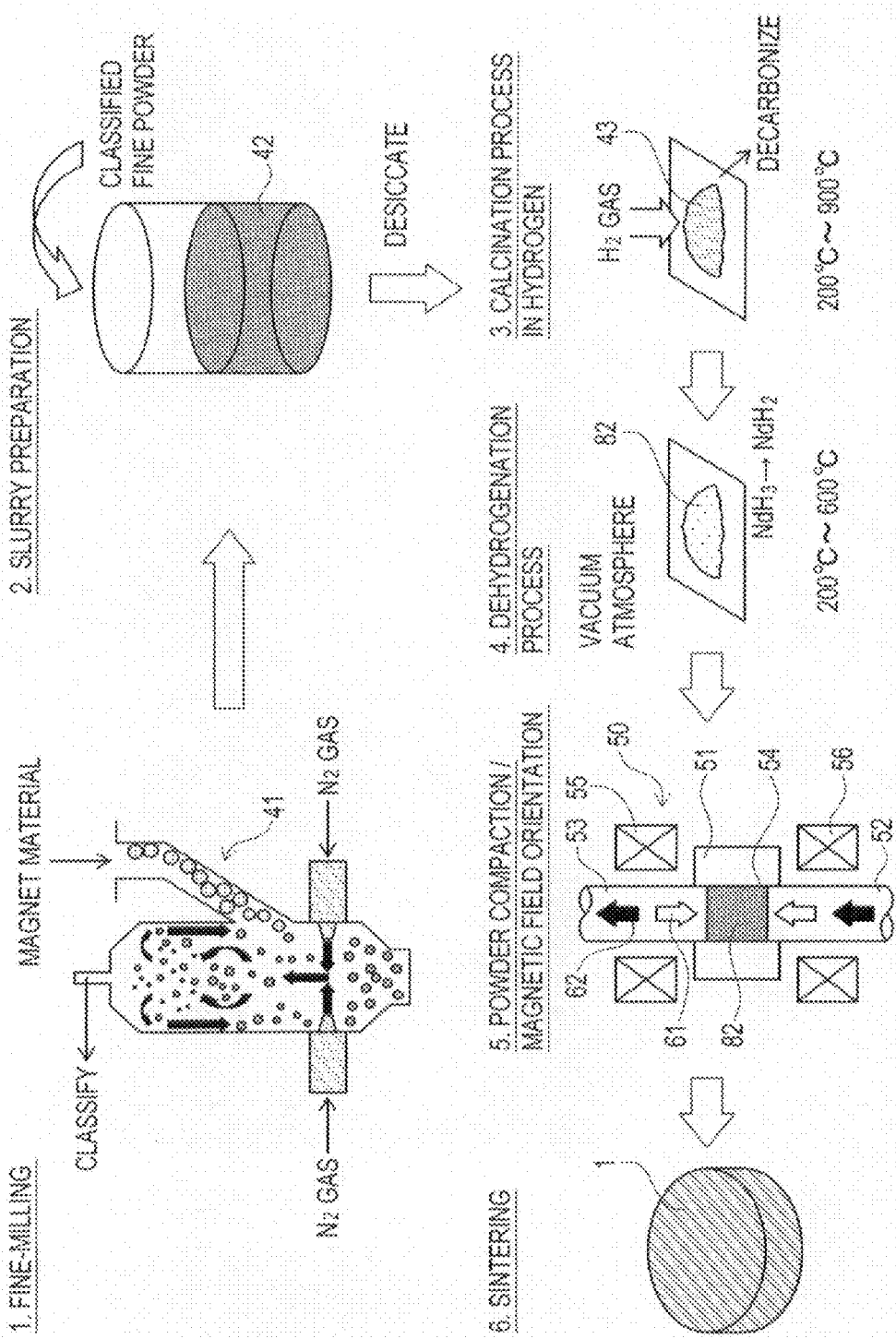
FIG. 6 is an explanatory diagram illustrating manufacturing processes of a permanent magnet according to a second manufacturing method of the invention.

Next, the second method for manufacturing the permanent magnet 1 which is an alternative manufacturing method will be described below with reference to FIG. 6. FIG. 6 is an explanatory view illustrating a manufacturing process in the second method for manufacturing the permanent magnet 1 directed to the present invention.

The process until the slurry 42 is manufactured is the same as the manufacturing process in the first manufacturing method already discussed referring to FIG. 5, therefore detailed explanation thereof is omitted.

Firstly, the prepared slurry 42 is desiccated in advance through vacuum desiccation or the like before compaction and desiccated magnet powder 43 is obtained. Then, the desiccated magnet powder 43 is held for several hours (for instance, five hours) in hydrogen atmosphere at 200 through 900 degrees Celsius, or more preferably 400 through 900 degrees Celsius (for instance, 600 degrees Celsius), for a calcination process in hydrogen. The hydrogen feed rate during the calcination is 5 L/min. So-called decarbonization is performed in this calcination process in hydrogen. In the decarbonization, the organometallic compound is thermally decomposed so that carbon content in the calcined body can be decreased. Furthermore, calcination process in hydrogen is to be performed under a condition of 0.1 wt % carbon content or less in the calcined body, or more preferably 0.05 wt % or less. Accordingly, it becomes possible to densely sinter the permanent magnet 1 as a whole in the following sintering process, and the decrease in the residual magnetic flux density and coercive force can be prevented.

Secondly, the powdery calcined body 82 calcined through the calcination process in hydrogen is held for one through three hours in vacuum atmosphere at 200 through 600 degrees Celsius, or more preferably 400 through 600 degrees Celsius for a dehydrogenation process. Incidentally, the degree of vacuum is preferably equal to or smaller than 0.1 Torr.

Here, $NdH_3$ exists in the calcined body 82 calcined through the calcination process in hydrogen as above described, which indicates a problematic tendency to combine with oxygen.

Figure 7:
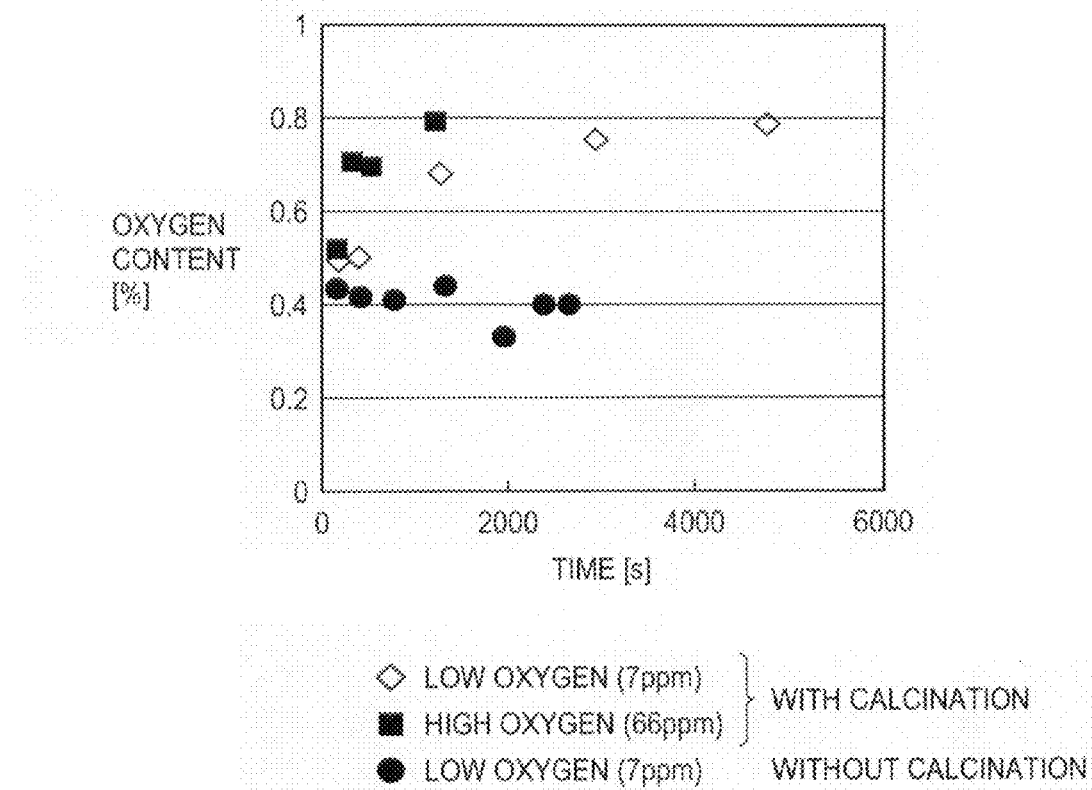
FIG. 7 is a diagram illustrating changes of oxygen content with and without a calcination process in hydrogen.

FIG. 7 is a diagram depicting oxygen content of magnet powder with respect to exposure duration, when Nd magnet powder with a calcination process in hydrogen and Nd magnet powder without a calcination process in hydrogen are exposed to each of the atmosphere with oxygen concentration of 7 ppm and the atmosphere with oxygen concentration of 66 ppm. As illustrated in FIG. 7, when the Nd magnet powder with the calcination process in hydrogen is exposed to the atmosphere with high-oxygen concentration of 66 ppm, the oxygen content of the magnet powder increases from 0.4% to 0.8% in approximately 1000 sec. Even when the Nd magnet powder with the calcination process is exposed to the atmosphere with low-oxygen concentration of 7 ppm, the oxygen content of the magnet powder still increases from 0.4% to the similar amount 0.8%, in approximately 5000 sec. Oxygen combined with Nd magnet particles causes the decrease in the residual magnetic flux density and in the coercive force.

Therefore, in the above dehydrogenation process, $NdH_3$ (having high activity level) in the calcined body 82 created at the calcination process in hydrogen is gradually changed: from $NdH_3$ (having high activity level) to $NdH_2$ (having low activity level). As a result, the activity level is decreased with respect to the calcined body 82 activated by the calcination process in hydrogen. Accordingly, if the calcined body 82 calcined at the calcination process in hydrogen is later moved into the external air, Nd magnet particles therein are prevented from combining with oxygen, and the decrease in the residual magnetic flux density and coercive force can also be prevented.

Then, the powdery calcined body 82 after the dehydrogenation process undergoes the powder compaction to be compressed into a given shape using the compaction device 50.

Details are omitted with respect to the compaction device 50 because the manufacturing process here is similar to that of the first manufacturing method already described referring to FIG. 5.

Then, there is performed a sintering process for sintering the compacted-state calcined body 82. The sintering process is performed by the vacuum sintering or the pressure sintering similar to the above first manufacturing method. Details of the sintering condition are omitted because the manufacturing process here is similar to that of the first manufacturing method already described. As a result of the sintering, the permanent magnet 1 is manufactured.

However, the second manufacturing method discussed above has an advantage that the calcination process in hydrogen is performed to the powdery magnet particles, therefore the thermal decomposition of the organometallic compound can be more easily caused to the whole magnet particles, in comparison with the first manufacturing method in which the calcination process in hydrogen is performed to the compacted magnet particles. That is, it becomes possible to securely decrease the carbon content of the calcined body, in comparison with the first manufacturing method.

However, in the first manufacturing method, the compact body 71 after calcined in hydrogen is brought to the sintering without being exposed to the external air, eliminating the need for the dehydrogenation process. Accordingly, the manufacturing process can be simplified in comparison with the second manufacturing method. However, also in the second manufacturing method, in a case where the sintering is performed without any exposure to the external air after calcined in hydrogen, the dehydrogenation process becomes unnecessary.

EMBODIMENTS

Here will be described embodiments according to the present invention referring to comparative examples for comparison.

Embodiment 1

In comparison with fraction regarding alloy composition of a neodymium magnet according to the stoichiometric composition (Nd: 26.7 wt %, Fe (electrolytic iron): 72.3 wt %, B: 1.0 wt %), proportion of Nd in that of the neodymium magnet powder for the embodiment 1 is set higher, such as Nd/Fe/B=32.7/65.96/1.34 in wt %, for instance. Further, 5 wt % of niobium n-propoxide has been added as organometallic compound to the milled neodymium magnet powder. A calcination process has been performed by holding a compact body of the magnet powder for five hours in hydrogen atmosphere at 600 degrees Celsius. The hydrogen feed rate during the calcination is 5 L/min. Sintering of the compacted-state calcined body has been performed in the SPS. Other processes are the same as the processes in [First Method for Manufacturing Permanent Magnet] mentioned above.

Embodiment 2

Niobium n-butoxide has been used as organometallic compound to be added. Other conditions are the same as the conditions in embodiment 1.

Embodiment 3

Sintering of a compacted-state calcined body has been performed in the vacuum sintering instead of the SPS. Other conditions are the same as the conditions in embodiment 1.

Comparative Example 1

Niobium n-propoxide has been used as organometallic compound to be added, and sintering has been performed without undergoing a calcination process in hydrogen. Other conditions are the same as the conditions in embodiment 1.

Comparative Example 2

Niobium n-butoxide has been used as organometallic compound to be added, and sintering has been performed without undergoing a calcination process in hydrogen. Other conditions are the same as the conditions in embodiment 1.

Comparative Example 3

A calcination process has been performed in helium atmosphere instead of hydrogen atmosphere. Further, sintering of a compacted-state calcined body has been performed in the vacuum sintering instead of the SPS. Other conditions are the same as the conditions in embodiment 1.

Comparative Example 4

A calcination process has been performed in vacuum atmosphere instead of hydrogen atmosphere. Further, sintering of a compacted-state calcined body has been performed in the vacuum sintering instead of the SPS. Other conditions are the same as the conditions in embodiment 1.

(Comparison of Embodiments with Comparative Examples Regarding Residual Carbon Content)

The table of FIG. 8 shows residual carbon content [wt %] in permanent magnets according to embodiments 1 and 2 and comparative examples 1 and 2, respectively.

As shown in FIG. 8, the carbon content remaining in the magnet particles can be significantly reduced in embodiments 1 and 2 in comparison with comparative examples 1 and 2. Specifically, the carbon content remaining in the magnet particles can be made 0.1 wt % or less in each of embodiments 1 and 2.

Further, in comparison between the embodiments 1 and 2 and the comparative examples 1 and 2, despite addition of the same organometallic compound, they have got significant difference with respect to carbon content in magnet particles depending on with or without calcination process in hydrogen; the cases with the calcination process in hydrogen can reduce carbon content more significantly than the cases without. In other words, through the calcination process in hydrogen, there can be performed a so-called decarbonization in which the organometallic compound is thermally decomposed so that carbon content in the calcined body can be decreased. As a result, it becomes possible to densely sinter the entirety of the magnet and to prevent the coercive force from degradation.

Referring to residual carbon content in the permanent magnets of the embodiments 1 and 2, carbon content in the magnet powder can be more significantly decreased in the case of adding an organometallic compound represented as $M\text{-}(OR)_x$ (in the formula, M represents V, Mo, Zr, Ta, Ti, W or Nb, R represents a substituent group consisting of a straight-chain or branched-chain hydrocarbon and $x$ represents an arbitrary integer). In other words, decarbonization can be easily caused during the calcination process in hydrogen by using an organometallic compound represented as $M\text{-}(OR)_x$ (in the formula, M represents V, Mo, Zr, Ta, Ti, W or Nb, R represents a substituent group consisting of a straight-chain or branched-chain hydrocarbon and $x$ represents an arbitrary integer) as additive. As a result, it becomes possible to densely sinter the entirety of the magnet and to prevent the coercive force from degradation. Further, it is preferable to use as organometallic compound to be added an organometallic compound consisting of an alkyl group, more preferably organometallic compound consisting of an alkyl group of which carbon number is any one of integer numbers 2 through 6, which enables the organometallic compound to thermally decompose at a low temperature when calcining the compact body in hydrogen atmosphere. Thereby, thermal decomposition of the organometallic compound can be more easily performed over the entirety of the compact body.

(Result of Surface Analysis with XMA Carried Out for Permanent Magnets)

Figure 10:
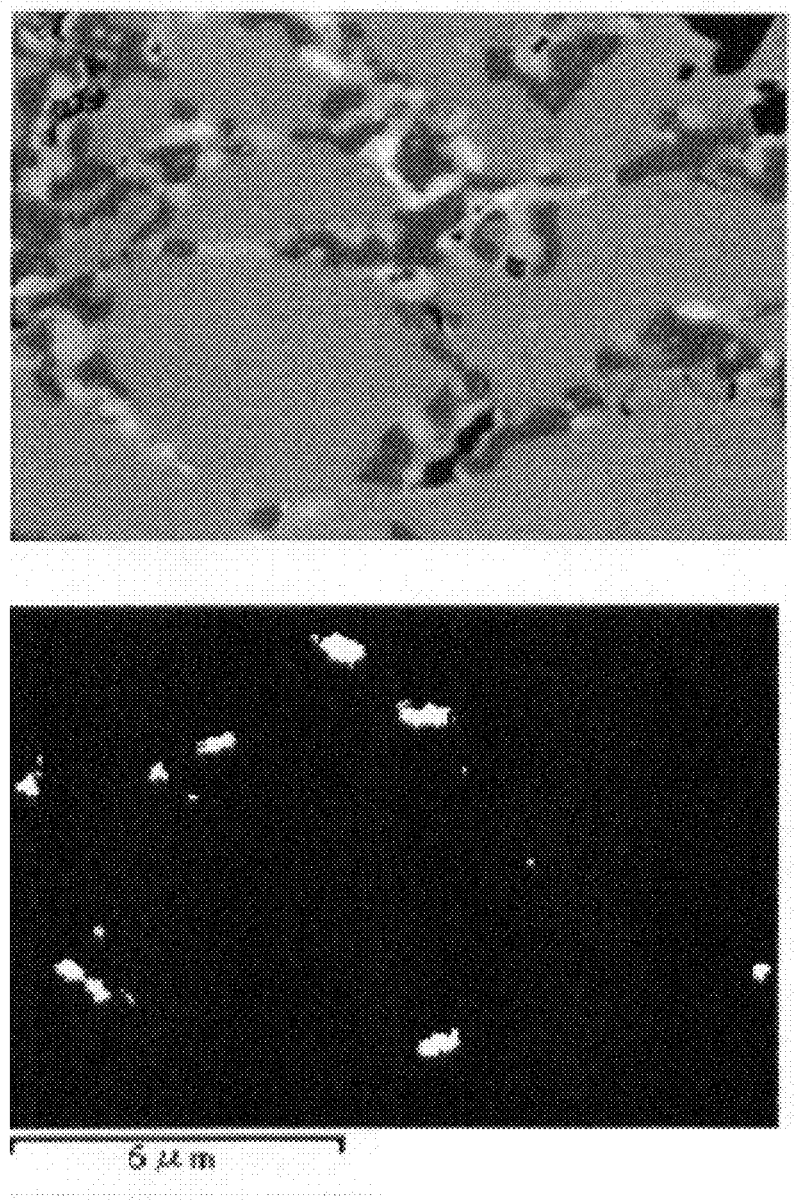
FIG. 10 is an SEM image and mapping of a distribution state of Nb element in the same visual field with the SEM image of the permanent magnet of the embodiment 1 after sintering.
Figure 11:
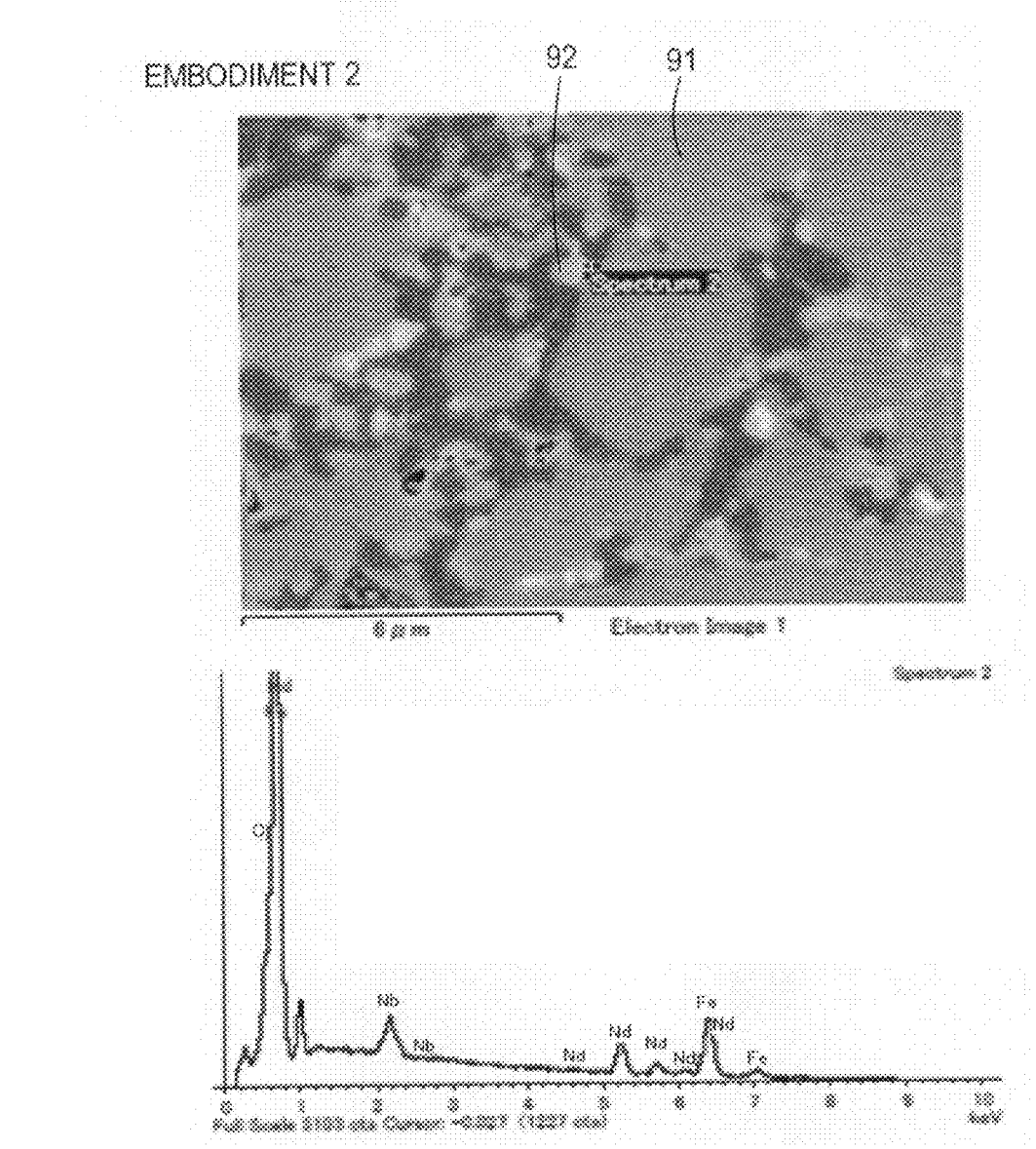
FIG. 11 is an SEM image and an element analysis result on a grain boundary phase of the permanent magnet of the embodiment 2 after sintering.

Surface analysis with an XMA (X-ray micro analyzer) has been carried out for each of permanent magnets directed to the embodiments 1 and 2. FIG. 9 is an SEM image and an element analysis result on a grain boundary phase of the permanent magnet of the embodiment 1 after sintering. FIG. 10 is an SEM image and mapping of a distribution state of Nb element in the same visual field with the SEM image of the permanent magnet of the embodiment 1 after sintering. FIG. 11 is an SEM image and an element analysis result on a grain boundary phase of the permanent magnet of the embodiment 2 after sintering.

As shown in FIG. 9 and FIG. 11, Nb is detected in the grain boundary phase of each of the permanent magnets of the embodiments 1 and 2. That is, in each of the permanent magnets directed to the embodiments 1 and 2, it is observed that a phase of NbFe-based intermetallic compound where Nb substitutes for part of Nd is formed on surfaces of grains of the main phase.

In the mapping of FIG. 10, white portions represent distribution of Nb element. The set of the SEM image and the mapping in FIG. 10 explains that white portions (i.e., Nb element) are concentrated at the perimeter of the main phase. That is, in the permanent magnet of the embodiment 1, Nb does not disperse from a grain boundary phase to the main phase, but is concentrated at the grain boundaries in the magnet.

The above results indicate that, in the embodiments 1 and 2, Nb does not disperse from a grain boundary phase to a main phase, but can be concentrated in grain boundaries of the magnet. Further, as Nb. does not solid-solutionize into the main phase, grain growth can be inhibited through solid-phase sintering.

(Review with SEM Images of Embodiments)

Comparison will be made with the SEM images of the embodiments 1 and 2. With respect to the embodiments 1 and 2 in which residual carbon content is equal to specific amount or lower (e.g., 0.1 wt % or lower), there can be commonly observed formation of a sintered permanent magnet basically constituted by a main phase of neodymium magnet ($Nd_2Fe_{14}B$) 91 and a grain boundary phase 92 that looks like white speckles. Also, a small amount of alpha iron phase is formed there. On the other hand, with respect to the comparative examples 1 and 2 in which residual carbon content is larger in comparison with the embodiments 1 and 2, there can be expected formation of considerable number of alpha iron phases in addition to a main phase 91 and a grain boundary phase 92. It is to be noted that alpha iron is generated due to carbide that remains at the time of sintering. That is, reactivity of Nd and carbon is significantly high and in case carbon-containing material remains in the organometallic compound even at a high-temperature stage in a sintering process like the comparative examples 1 and 2, carbide is formed. Consequently, the thus formed carbide causes alpha iron to separate out in a main phase of a sintered magnet and magnetic properties is considerably degraded.

On the other hand, as described in the above, the embodiments 1 and 2 each use proper organometallic compound and perform calcination process in hydrogen so that the organometallic compound is thermally decomposed and carbon contained therein can be burned off previously (i.e., carbon content can be reduced). Especially, by setting calcination temperature to a range between 200 and 900 degrees Celsius, more preferably to a range between 400 and 900 degrees Celsius, carbon contained therein can be burned off more than required and carbon content remaining in the magnet after sintering can be restricted to the extent of 0.1 wt % or less, more preferably, 0.05 wt % or less. In the embodiments 1 and 2 where carbon content remaining in the magnet is 0.1 wt % or less, little carbide is formed in a sintering process, which avoids the problem such like the appearance of the considerable number of alpha iron phases that can be expected in the comparative examples 1 and 2. Consequently, as shown in FIG. 9 and FIG. 11, the entirety of the respective permanent magnet 1 can be sintered densely through the sintering process. Further, considerable amount of alpha iron does not separate out in a main phase of the sintered magnet so that serious degradation of magnetic properties can be avoided. Still further, only Nb (or other) can be concentrated in grain boundaries in a selective manner, Nb (or other) contributing to improvement of coercive force. Thus, the present invention intends to reduce the carbon residue by means of thermal decomposition at a low temperature. Therefore, in view of the intention, as to-be-added organometallic compound, it is preferable to use a low molecular weight compound (e.g., the one consisting of an alkyl group of which carbon number is any one of integer numbers 2 through 6).

(Comparative Review of Embodiments and Comparative Examples Based on Conditions of Calcination Process in Hydrogen)

Figure 12:
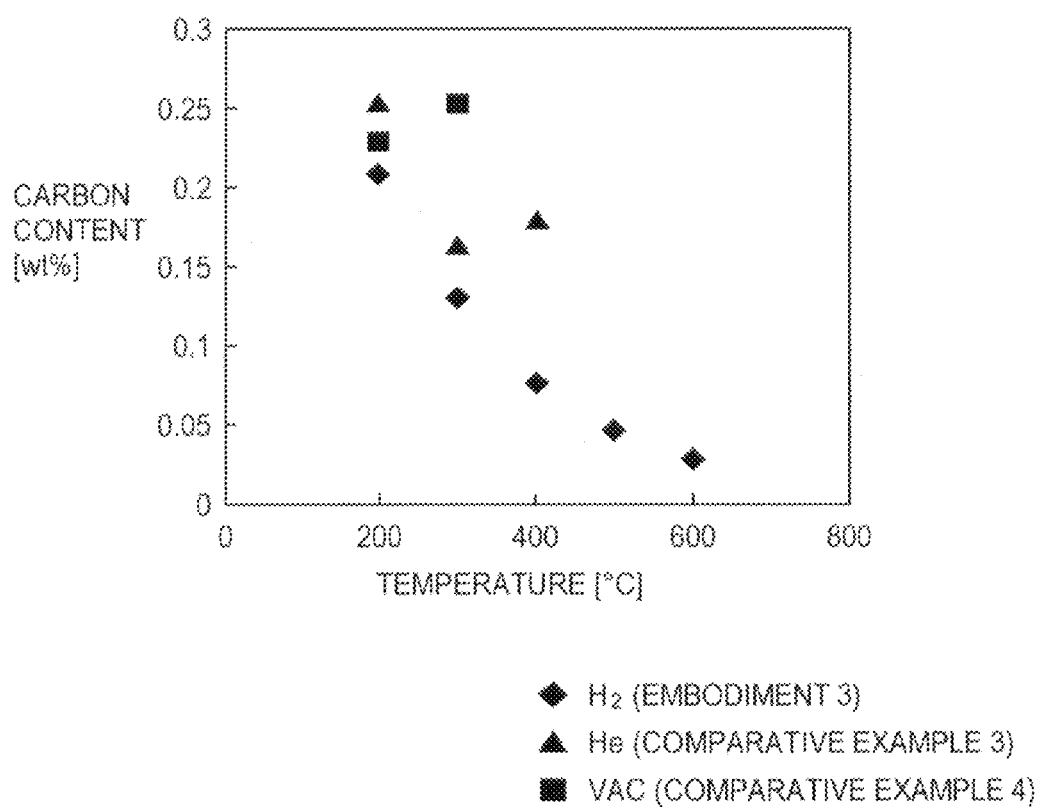
FIG. 12 is a diagram of carbon content in a plurality of permanent magnets manufactured under different conditions of calcination temperature with respect to permanent magnets of embodiment 3 and comparative examples 3 and 4.

FIG. 12 is a diagram of carbon content [wt %] in a plurality of permanent magnets manufactured under different conditions of calcination temperature with respect to permanent magnets of embodiment 3 and comparative examples 3 and 4. It is to be noted that FIG. 12 shows results obtained on condition feed rate of hydrogen and that of helium are similarly set to 1 L/min and held for three hours.

It is apparent from FIG. 12 that, in case of calcination in hydrogen atmosphere, carbon content in magnet particles can be reduced more significantly in comparison with cases of calcination in helium atmosphere and vacuum atmosphere. It is also apparent from FIG. 12 that carbon content in magnet particles can be reduced more significantly as calcination temperature in hydrogen atmosphere is set higher. Especially, by setting the calcination temperature to a range between 400 and 900 degrees Celsius, carbon content can be reduced 0.1 wt % or less.

In the above embodiments 1 through 3 and comparative examples 1 through 4, permanent magnets manufactured in accordance with [First Method for Manufacturing Permanent Magnet] have been used. Similar results can be obtained in case of using permanent magnets manufactured in accordance with [Second Method for Manufacturing Permanent Magnet].

As described in the above, with respect to the permanent magnet 1 and the manufacturing method of the permanent magnet 1 directed to the above embodiments, an organometallic compound solution is added to fine powder of milled neodymium magnet material so as to uniformly adhere the organometallic compound to particle surfaces of the neodymium magnet powder, the organometallic compound being expressed with a structural formula of M-(OR)$_X$ (M represents V, Mo, Zr, Ta, Ti, W or Nb, R represents a substituent group consisting of a straight-chain or branched-chain hydrocarbon and $_X$ represents an arbitrary integer). Thereafter, a compact body formed through powder compaction is held for several hours in hydrogen atmosphere at 200 through 900 degrees Celsius for a calcination process in hydrogen. Thereafter, through vacuum sintering or pressure sintering, the permanent magnet 1 is manufactured. Owing to the above processes, even though amount of to-be-added Nb (or other) is made less in comparison with conventional one, Nb (or other) added thereto can be efficiently concentrated in grain boundaries of the magnet. Consequently, grain growth can be prevented in the magnet particles at sintering, and at the same time exchange interaction can be disrupted among the magnet particles after sintering so as to prevent magnetization reversal in the magnet particles, making it possible to improve the magnetic performance thereof. Further, decarbonization is made easier when adding the above specified organometallic compound to magnet powder in comparison with when adding other organometallic compounds. Furthermore, such sufficient decarbonization can avoid decline in coercive force which is likely to be caused by carbon contained in the sintered magnet. Furthermore, owing to such sufficient decarbonization, the entirety of the magnet can be sintered densely.

Still further, Nb (or other) being refractory metal is concentrated in grain boundaries of the sintered magnet. Therefore, Nb (or other) concentrated in the grain boundaries inhibits grain growth in the magnet particles at sintering and, and at the same time, disrupts exchange interaction among the magnet particles after sintering so as to prevent magnetization reversal in the magnet particles, making it possible to improve the magnetic performance thereof. Further, since amount of Nb (or other) added thereto is less in comparison with conventional amount thereof, decline in residual magnetic flux density can be avoided.

Still further, the magnet to which organometallic compound has been added is calcined in hydrogen atmosphere so that the organometallic compound is thermally decomposed and carbon contained therein can be burned off previously (i.e., carbon content can be reduced). Therefore, little carbide is formed in a sintering process. Consequently, the entirety of the magnet can be sintered densely without making a gap between a main phase and a grain boundary phase in the sintered magnet and decline of coercive force can be avoided. Further, considerable alpha iron does not separate out in the main phase of the sintered magnet and serious deterioration of magnetic properties can be avoided.

Still further, as typical organometallic compound to be added to magnet powder, it is preferable to use an organometallic compound consisting of an alkyl group, more preferably an alkyl group of which carbon number is any one of integer numbers 2 through 6. By using such configured organometallic compound, the organometallic compound can be thermally decomposed easily at a low temperature when the magnet powder or the compact body is calcined in hydrogen atmosphere. Thereby, the organometallic compound in the entirety of the magnet powder or the compact body can be thermally decomposed more easily.

Still further, in the process of calcining the magnet powder of the compact body, the compact body is held for predetermined length of time within a temperature range between 200 and 900 degrees Celsius, more preferably, between 400 and 900 degrees Celsius. Therefore, carbon contained therein can be burned off more than required.

As a result, carbon content remaining after sintering is 0.1 wt % or less, more preferably, 0.05 wt % or less. Thereby, the entirety of the magnet can be sintered densely without occurrence of a gap between a main phase and a grain boundary phase and decline in residual magnetic flux density can be avoided. Further, this configuration prevents considerable alpha iron from separating out in the main phase of the sintered magnet so that serious deterioration of magnetic characters can be avoided.

In the second manufacturing method, calcination process is performed to the powdery magnet particles, therefore the thermal decomposition of the organometallic compound can be more easily performed to the whole magnet particles in comparison with a case of calcining compacted magnet particles. That is, it becomes possible to reliably decrease the carbon content of the calcined body. By performing dehydrogenation process after calcination process, activity level is decreased with respect to the calcined body activated by the calcination process. Thereby, the resultant magnet particles are prevented from combining with oxygen and the decrease in the residual magnetic flux density and coercive force can also be prevented.

Still further, the dehydrogenation process is performed in such manner that the magnet powder is held for predetermined length of time within a range between 200 and 600 degrees Celsius. Therefore, even if NdH$_3$ having high activity level is produced in a Nd-based magnet that has undergone calcination process in hydrogen, all the produced NdH$_3$ can be changed to NdH$_2$ having low activity level.

Not to mention, the present invention is not limited to the above-described embodiment but may be variously improved and modified without departing from the scope of the present invention.

Further, of magnet powder, milling condition, mixing condition, calcination condition, dehydrogenation condition, sintering condition, etc. are not restricted to conditions described in the embodiments.

Further, in the embodiments 1 through 3, niobium n-propoxide or niobium n-butoxide is used as organometallic compound containing Nb (or other) that is to be added to magnet powder. Other organometallic compounds may be used as long as being an organometallic compound that satisfies a formula of M-(OR)$_X$ (M represents V, Mo, Zr, Ta, Ti, W or Nb, R represents a substituent group consisting of a straight-chain or branched-chain hydrocarbon, and $_X$ represents an arbitrary integer). For instance, there may be used an organometallic compound of which carbon number is 7 or larger and an organometallic compound including a substituent group consisting of carbon hydride other than an alkyl group.

EXPLANATION OF REFERENCES

1 permanent magnet
10 Nd crystal grain
11 refractory metal layer
12 refractory metal agglomerate
91 main phase
92 grain boundary phase

The invention claimed is:

1. A manufacturing method of a Nd—Fe—B based permanent magnet comprising steps of
   milling magnet material into magnet powder;
   adding an organometallic compound expressed with a structural formula of

M-(OR)$_X$,

M representing V, Mo, Zr, Ta, Ti, W or Nb, R representing a substituent group consisting of a straight-chain or branched-chain hydrocarbon, and $_X$ representing an arbitrary integer, to the magnet powder obtained at the step of milling magnet material and getting the organometallic compound adhered to particle surfaces of the magnet powder;

compacting the magnet powder of which particle surfaces have got adhesion of the organometallic compound so as to obtain a compact body;

calcining the compact body in hydrogen atmosphere so as to obtain a calcined body; and sintering the calcined body, wherein the permanent magnet is Nd—Fe—B based.

2. The manufacturing method of a Nd—Fe—B based permanent magnet according to claim 1, wherein R in the structural formula is an alkyl group.

3. The manufacturing method of a Nd—Fe—B based permanent magnet according to claim 2, wherein R in the structural formula is an alkyl group of which carbon number is any one of integer numbers 2 through 6.

4. The manufacturing method of a Nd—Fe—B based permanent magnet according to claim 1, wherein, in the step of calcining the compact body, the compact body is held for predetermined length of time within a temperature range between 200 and 900 degrees Celsius.

* * * * *